United States Patent [19]

Lee et al.

[11] Patent Number: 4,620,224
[45] Date of Patent: Oct. 28, 1986

[54] VIDEO SCRAMBLING TECHNIQUE FOR MULTIPLEXED ANALOG COMPONENT FORMATS

[75] Inventors: Lin-nan Lee, Potomac; Mark D. Redman, Clarksburg, both of Md.

[73] Assignee: Communications Satellite Corp., Washington, D.C.

[21] Appl. No.: 719,200

[22] Filed: Apr. 3, 1985

[51] Int. Cl.⁴ .......................... H04K 1/00; H04N 7/16; H04N 7/167
[52] U.S. Cl. .................... 358/119; 358/122; 358/114
[58] Field of Search ............... 358/114, 119, 123, 122, 358/12

[56] References Cited

U.S. PATENT DOCUMENTS 3,958,077 5/1976 Ross et al. ............................ 358/119
4,070,693 1/1978 Shutterly ............................. 358/123
4,547,802 10/1985 Fogarty et al. ...................... 358/123

FOREIGN PATENT DOCUMENTS 8211826 4/1982 United Kingdom ................ 358/114

Primary Examiner—S. C. Buczinski
Assistant Examiner—Melissa Koltak
Attorney, Agent, or Firm—Sughrue, Mion, Zinn, Macpeak and Seas

[57] ABSTRACT

A method for scrambling a television signal for use with a multiplexed analog component (MAC) format employs a three digital bit code for each horizontal line of the picture. The bits identify the position of the luminance and chrominance information of the signal for every line of the television picture and whether the information is to be scanned from left to right or right to left.

8 Claims, 10 Drawing Figures

000 TRANSMISSION FORMAT

FIG.1(a) 000 TRANSMISSION FORMAT
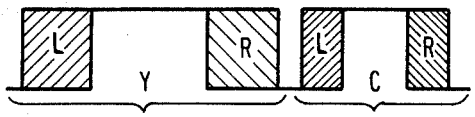
FIG.1(e) 100 TRANSMISSION FORMAT
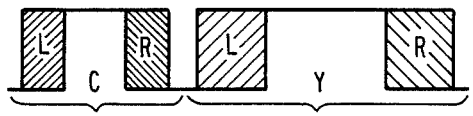
FIG.1(b) 001 TRANSMISSION FORMAT
FIG.1(f) 101 TRANSMISSION FORMAT
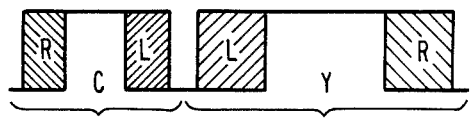
FIG.1(c) 010 TRANSMISSION FORMAT
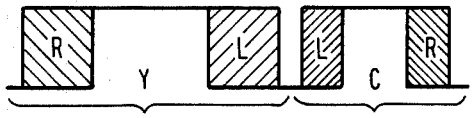
FIG.1(g) 110 TRANSMISSION FORMAT
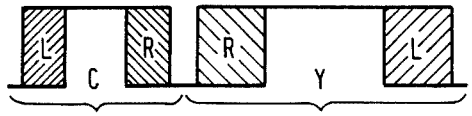
FIG.1(d) 011 TRANSMISSION FORMAT
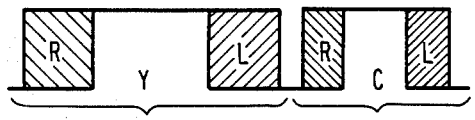
FIG.1(h) 111 TRANSMISSION FORMAT
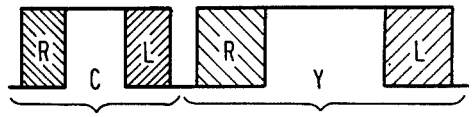
LEGEND
 Y = LUMA LINE BURST
 C = CHROMA LINE BURST
 L & R = LEFT AND RIGHT SIDE OF RASTER RESPECTIVELY

VIDEO SCRAMBLING TECHNIQUE FOR MULTIPLEXED ANALOG COMPONENT FORMATS

FIELD OF THE INVENTION

The invention relates to a method for scrambling a television signal. More specifically, the invention relates to a method for scrambling a television video signal in a multiplexed analog component (MAC) format by providing three bits for each horizontal line of the picture which are encoded to identify whether the luminance (Y) and chrominance (C) portions of the signal for a particular line of the picture are interchanged and whether the line should be scanned from left to right or from right to left.

DESCRIPTION OF THE PRIOR ART

The multiplexed analog component format is a relatively new television transmission format which has been adopted by the European Broadcasting Union (EBU) and is being considered seriously as the video transmission format in the United States for special broadcasting services, such as direct broadcast satellite services. The MAC format is a non-standard composite signal, i.e., the different multiplexed components are transmitted separately in time. For commercial reasons, it is sometimes desirable to scramble the video signal. Some techniques which originally were designed for scrambling composite video signals (NTSC, PAL, for example) such as the polarity inversion technique, or the line rotation technique, may also be used for scrambling the MAC signal.

The polarity inversion technique generally inverts the amplitude polarity of the video signal randomly on a line-by-line or field-by-field basis. One disadvantage of the polarity inversion technique is its sensitivity to receiver level and gain control.

An example of this class of techniques is disclosed in U.S. Pat. No. 4,389,671 to Posner et al, which shows a scrambling system for satellite broadcast television signals. The scrambling technique described therein is one of inverting selected horizontal lines of the transmitted television picture in accordance with the output of a PN sequence generator.

Another example of this class of techniques is disclosed in U.S. Pat. No. 4,307,416 to Spano which also shows a television transmission technique which scrambles by inverting the video signal. Scrambling is accomplished before the RBG color signals are converted into the luminance and chrominance portions.

The line rotation technique has been adopted by the EBU as the standard scrambling technique in Europe. The line rotation technique selects a random point B in a scan line ABC. The segment BC is transmitted first and is followed by the segment AB. Without information pertaining to the position of B, a receiver cannot recover the original scan line readily, thus providing effective scrambling of the signal. A disadvantage of the line rotation technique is associated with the difficulties involved in rejoining the segments AB and BC.

Time dispersal techniques also have been proposed for scrambling video signals. The beginning of an active video signal in each scan line is dispersed with respect to the horizontal sync pulse. A disadvantage of time dispersal techniques is that the scrambling is not sufficient to distort the image completely if the time dispersion is limited to the interval available in the horizontal blanking period. Implementation of time dispersing techniques becomes complex if multi-line dispersion is utilized.

SUMMARY OF THE INVENTION

The unique properties of the MAC format in which the luminance and chrominance information is transmitted in separate time intervals, permit the use of very simple techniques for signal scrambling.

The MAC concept is fundamentally different from the standard NTSC format. The latter uses frequency division multiplexing (FDM) to mix the various components of the broadcast waveform. That is, the luminance component is kept at the baseband frequency while the chrominance component is translated in frequency by the 3.58 MHZ chroma subcarrier and the audio component is translated to nominally 4.5 MHZ. The MAC format essentially uses a time division multiplexing (TDM) technique which transmits only one component at a time in short time bursts. This is accomplished by sampling the various video components at one sampling rate, storing a horizontal line of this video information and then transmitting this data at a higher sampling rate. This reduces the time duration needed to transmit the entire line component and permits other components to be interleaved in a TDM manner.

The "full-bandwidth" color components of a video waveform are the red, green, and blue components. To reduce the bandwidth required for transmission and to take advantage of the physiological aspects of the human eye, the three components are invariably transformed into a "full-bandwidth" luminance component and two quadrature, reduced bandwidth chrominance components, U and V. The MAC format uses signal processing techniques to reduce this requirement even further to one luminance component and one chrominance component.

Because the transmitter and receiver necessarily must have line stores for the signal processing functions, a number of alternatives are possible in the choice of the transmission format. For example, it is possible to store the components in memory and to scan or read them out in the same or reverse order from the manner in which they were written. Effectively, this rotates the image that would appear on the television raster if it were directly displayed, depending on the order the signal is read from memory. Thus, the MAC waveform may be transmitted in a variety of formats.

The scrambling technique presented herein, uses a pseudo-random number (PN) generator to select one of these formats in a random manner for every line transmitted. Therefore, if a receiver does not have the information required to decode the scrambled signal, it would not be able to identify which format is being transmitted and it would decode the signal incorrectly.

The present invention uses the output of a PN generator at the beginning of each horizontal line of a television picture to identify the position and scanning direction of the chrominance and luminance signal portions for that line.

An object of the present invention is to provide a method for scrambling television video signals in the MAC format which is insensitive to level and gain variation of the receiver.

Another object of the invention is to provide a method for scrambling television video signals which is very simple and inexpensive to implement.

The foregoing and other objects features and advantages the invention will be apparent from the following more particular description of a preferred embodiment of the invention, as illustrated in the accompanying drawing.

BRIEF DESCRIPTION OF THE DRAWING

The foregoing and other objects, features and advantages of the invention will be apparent to one having ordinary skill in the art from the more particular description of a preferred embodiment of the invention, as illustrated in the accompanying drawing wherein:

FIGS. 1a through 1h show eight possible transmission formats.

DESCRIPTION OF THE PREFERRED EMBODIMENT(S)

Figure 2:
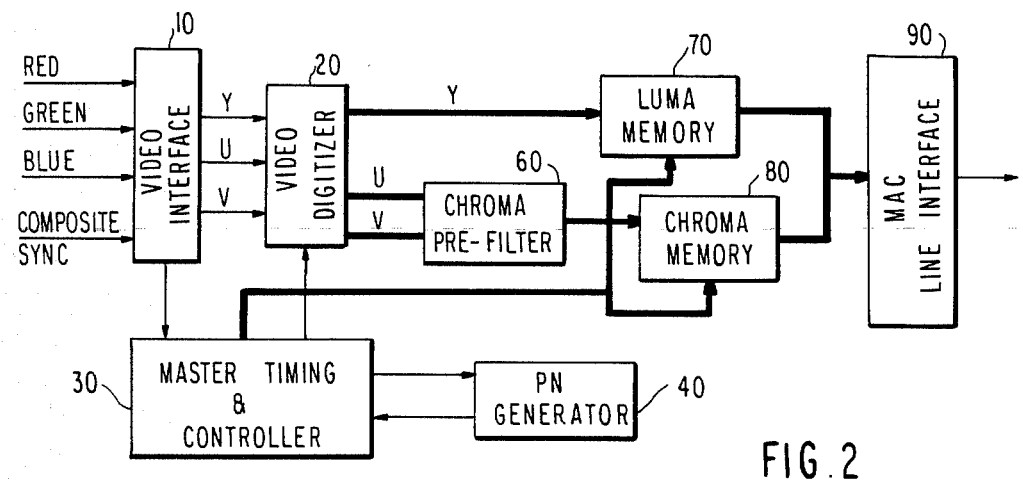
FIG. 2 is a block diagram of an MAC transmit base band processor electronic architecture.

The present invention uses three bits for every horizontal video line forming a code corresponding to the number generated by a pseudo-random number generator which controls a descrambler in the receiver. In a preferred embodiment, the first bit determines whether or not the luminance and chrominance portions of the television signal are interchanged. The second bit determines what action should be taken with the Y component, i.e., whether the luminance signal is scanned from the left to right or right to left. The third bit determines whether the chrominance signal is scanned from left to right or right to left. Of course, the particular order of the bits may be altered as would be readily understood by one having ordinary skill in the art.

FIGS. 1a through 1h show eight possible transmission formats of the video scrambling technique according to the present invention. By way of example, a transmission format corresponding to a horizontal line preceded by a code consisting of the three bits "000" has a luminance portion Y succeeded by a chrominance portion C. Both the luminance and chrominance portions are scanned from left to right. By way of contrast, FIG. 1h shows a transmission format corresponding to the three bits "111" wherein the chrominance portion is succeeded by the luminance portion and both portions of the signal are scanned from right to left.

FIG. 1b shows a transmission format corresponding to the code "001" wherein the luminance portion which is scanned from left to right is succeeded by the chrominance portion which is scanned from right to left. FIG. 1g shows a transmission format corresponding to the code "110" wherein the position and the scanning direction of the luminance and chominance portions is the reverse of FIG. 1b.

FIG. 1c shows a transmission format corresponding to the code "010" wherein the luminance and chrominance portions are positioned identically to their counterparts in FIG. 1b, however the scanning direction in each case is the reverse of that shown in FIG. 1b. FIG. 1f shows a transmission format corresponding to the code "101" wherein the position and the scanning direction of the chrominance and luminance portions is reversed from that shown in FIG. 1c.

Finally, FIG. 1d shows a transmission format corresponding to the code "011" wherein the luminance portion succeeded by the chrominance portion of the signal and both portions are scanned from right to left.

FIG. 1e shows a transmission format corresponding to the code "100" wherein the position of the luminance and chrominance portions and the direction of scanning is the reverse of that shown in FIG. 1d.

As can be determined from the above, the signal will be received without modification only one-eighth of the time, i.e., if the format shown in FIG. 1a is considered the normal or unscrambled signal format. About 50% of the time, a receiver without the correct code will interpret part of the luminance information as chrominance information and vice-versa corresponding to FIGS. 1e through 1h. In FIGS. b and c, respectively, the direction of scanning of the luminance and chrominance information is reversed. In FIG. 1d, the direction of scanning of both the luminance and chrominance information is reversed. Thus, a receiver without the correct code will be unable to interpret the luminance and chrominance information in seven out of eight instances shown. Accordingly, the signal is effectively scrambled.

The descrambler can be implemented very easily. Assuming an all digital implementation, the three control bits comprising the code obtained from a pseudo-random number generator are used to control three up-down counters.

The table shown below indicates the correspondence between the three digits and the formats shown in FIGS. 1a through 1h. The first bit determines the address action of the luminance portion of the video signal and the second bit determines the address action of the chrominance portion of the video signal. The third bit determines whether the luminance portion of the video signal will be transmitted before or after the chrominance portion of the video signal.

| RECEIVED CODE | Y-COMPONENT PLACEMENT | Y-ADDRESS ACTION | C-ADDRESS ACTION |
|---|---|---|---|
| 000 | First | Count Up | Count Up |
| 001 | First | Count Up | Count Dn |
| 010 | First | Count Dn | Count Up |
| 011 | First | Count Dn | Count Dn |
| 100 | Second | Count Up | Count Up |
| 101 | Second | Count Up | Count Dn |
| 110 | Second | Count Dn | Count Up |
| 111 | Second | Count Dn | Count Dn |

FIG. 2 illustrates the basic electronic architecture of a MAC transmitter according to the present invention. This Figure illustrates only the baseband portion of the full communication link since that is where all the source signal processing is performed. The ful broadcast link takes the output of this baseband processor and uses IF (usually FM) and RF (usually microwave up/down converters with antenna) subsystems to complete the communication requirements.

Red (R), green (G) and blue (B) color component signals and a composite sync signal are provided to a video interface and synchronization circuit 10 at the broadcast center. A synchronization signal in the form of composite sync from which the basic horizontal (H) and and vertical (V) timing signals may be extracted is also provided as an input to video interface circuit 10. Using conventional analog techniques, the RGB signals are matrixed to analog YUV signals for bandwidth reduction. The YUV components are converted to a digital data stream by analog-to-digital converters in video digitizer 20. Using the H and V signals from the video interface circuit 10, a master timing and controller circuit 30 generates all the timing and control signals required by all of the other components of the transmitter. The master timing and controller circuit will be discussed in more detail with respect to FIG. 3.

The master timing and controller circuit 30 synchronizes video digitizer 20. A chrominance pre-filter and discriminator 60 may be used when the two chrominance signals are transmitted in alternating lines. The Y signal component from the video digitizer 20 and the chrominance components U and V, i.e., the output of the chroma prefilter are read into luminance (Luma) memory 70 and chrominance (Chroma) memory 80, respectively. The contents of memories 70 and 80 are read into MAC interface circuit 90 for subsequent transmission.

Under the control of the PN generator 40, master timing and controller circuit 30 provides a video address signal which determines the order in which the video signal information is read from video memories 70 and 80. The code generated by the PN generator chooses the transmission format for any given line. An authorized receiver will have means to generate the same PN code which is synchronized to the transmitter. The transmitter waveform can therefore be decoded successfully.

The master timing and controller 30 circuit determines the manner in which the MAC video data is read from the luminance and chrominance RAM memories. That is, at the beginning of every MAC television signal burst, a three-bit control code is loaded and used to identify when each video burst begins and whether the address in the appropriate buffer memory should count up or count down for the individual component. The direction of address counting determines the scanning direction of the luminance and chrominance information. For example, assume there are addresses 1 through 100 in each buffer memory. Information will always be written in memory in order from address 1 to address 100. If the chrominance (or luminance) information is written into memory counting up from address 1 if it is scanned from address 1 to 100, it will be read out in the same order. However, if the same information is scanned counting down from address 100 it will be read out in a manner which is reversed from the direction it is written into the memory. In other words, if the address is counted up the raster will be scanned from left to right whereas if the address is counted down, the raster will be scanned from right to left.

Figure 3:
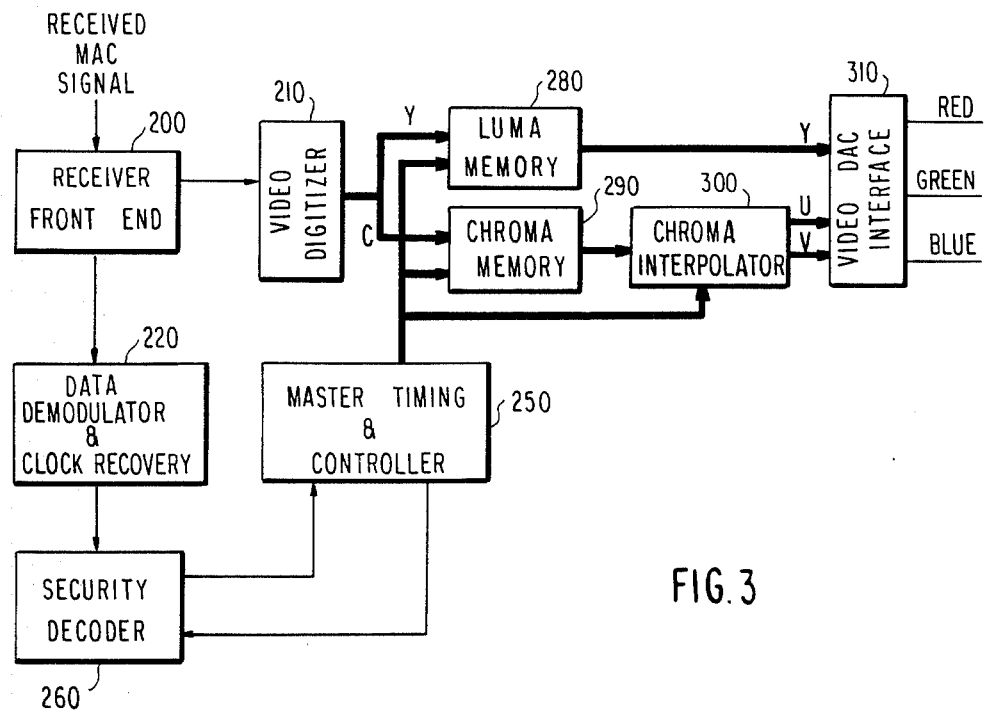
FIG. 3 is a block diagram of an MAC receiver baseband processor electronic architecture.

FIG. 3 is a block diagram of the baseband receiver electronic architecture. Again, it should be understood that the Figure shows a baseband processor of the total receiving link. The input signal comes from the IF receiver, which is usually an FM demodulator in a video satellite link.

The incoming received MAC waveform is first processed by the front end electronic circuitry 200. Here, the incoming waveform is conditioned through an automatic gain control technique to limit accurately the signal range presented to the rest of the receiver and desensitize the waveform from fades and other RF/IF link effects. This is especially important for the subsequent digital signal processing and the requirement to optimize the utilization (i.e., the dynamic range) of the video/MAC analog-to-digital conversion. The output of the front end circuitry 200 is split and then sent to the MAC video digitizer 210 and the data demodulation and clock recovery circuit 220.

The data demodulation and clock recovery circuit 220 provides the master clock frequency and demodulated data. The demodulated data contains synchronization information which is provided to the master timing and controller circuit 250. The master timing and controller circuit 250 then "knows" when a given video signal is being received. It does not yet "know" however, how these video signals were transmitted and therefore the authorized receiver receiving the demodulated data may be interpreted by a security decoder 260, which synchronizes a locally generated PN sequence to the PN generator 40 (FIG. 2) at the transmit end by any technique well known in the art.

By this means, the codes used to selected transmission format are recovered. The master timing and controller circuit 250 then uses this recovered data to determine the manner in which a given line should be decoded. That is, it uses this data to determine the manner in which the video memories are sequenced. The output of the master timer and controller circuit 250 constitutes a video address bus which controls the sequence in which the data output from MAC video digitizer 210 is read into Luma memory 280 and the Chroma memory 290. In addition, the output of the master controller is provided to C interpolator circuit 300 which provides the U and the V component signals to video DAC interface 310. The output of Y memory 280 is provided directly to the video DAC interface 310. The Y, U and V signals are combined to form the red, green and blue color video output signals.

Digitization of the analog signal components and their subsequent digital signal processing is considered to be the most economical and reliable means of implementation but it is not the only means by which the proposed scrambling technique may be implemented. The present invention may also be implemented with a custom charge-coupled-device, which can be clocked in both directions to accomplish the line video store. Since commercially available CCDs can only transfer charge in one direction, implementation with off-the-shelf CCDs would require some simplification of the scrambling method. Only one control bit per line is used. This bit will control whether or not the location of the luminance and chrominance is interchanged (FIG. 1a or FIG. 1g). Independently of the scrambling method, an additional bit may be used to control whether or not the polarity of the signal is inverted, if desirable.

Another variation of the invention utilizes fixed or periodic codes rather than one generated by a pseudorandom number generator. These variations, however, do not provide as much security as the preferred embodiment.

While a preferred embodiment of the present invention has been shown and described, it will be understood by those skilled in the art that the foregoing and other changes in form and detail may be made therein without departing from the spirit and scope of the invention which is limited only by the terms of the appended claims.

What is claimed is:

1. A method for scrambling a television signal comprising the steps of:
    formatting a television signal into a data portion and a video portion wherein said video portion has chrominance information and luminance information which portions are scanned for each horizontal line of a television picture;

writing said luminance portion and chrominance portion into luminance and chrominance memories, respectively;

encoding said data portion to represent the directions in which the chrominance information and luminance information are to be read; and encoding said data portion to represent the position of the chrominance information relative to the luminance information in the video portion.

2. In a multiplexed analog component television signal format including chrominance and luminance information which is scanned to produce a television picture, the method of scrambling said signal by inserting a data portion at the beginning of each horizontal scan line of a television picture comprising the steps of:

encoding two bits of the data portion to identify the respective direction which the chrominance and luminance information is scanned; and encoding a third bit of said data portion to represent the position of the chrominance portion relative to the luminance portion.

3. A method for formatting a multiplexed analog component television scan line signal having a luminance portion and a chrominance portion comprising the steps of:

separating said luminance and chrominance portions for every scan line of the television signal;

writing said luminance and chrominance portions into a luminance portion memory and a chrominance portion memory, respectively;

scanning the luminance portion memory in a preselected direction;

scanning the chrominance portion memory in a preselected direction;

providing a code at the beginning of each scan line which identifies the directions in which the luminance and chrominance portion memories are scanned and which identifies the relative position of the luminance and chrominance portion for a given scan line.

4. A method for formatting a multiplexed analog component television scan line signal having a luminance portion and a chrominance portion comprising the steps of:

separating said luminance and chrominance portions for every scan line of the television signal;

writing said luminance portion and said chrominance portion into a luminance portion memory and a chrominance portion memory, respectively;

scanning the luminance portion memory in a preselected direction;

scanning the chrominance portion memory in a preselected direction;

providing a pseudo-random number code at the beginning of each scan line which identifies the relative positions of the luminance and chrominance portions for a given scan line.

5. A method as set forth in claim 3 or claim 4 wherein the preselected direction that said luminance portion memory is scanned is different from the preselected direction that said chrominance portion is scanned.

6. The method as set forth in claims 3 or 4 wherein the preseted direction that said luminance portion memory is scanned is the reverse of the preselected direction that said chrominance portion memory is scanned.

7. The method of claims 1, 2, 3 or 4 wherein the relative position of said luminance portion and said chrominance portion is such that said luminance portion precedes said chrominance portion in a given scan line.

8. The method of claims 1, 2, 3 or 4 wherein the relative position of said luminance portion and said chrominance portion is such that said chrominance portion precedes said luminance portion for a given scan line.

* * * * *